United States Patent [19]

Wallace et al.

[11] Patent Number: 4,903,197

[45] Date of Patent: Feb. 20, 1990

[54] MEMORY BANK SELECTION ARRANGEMENT GENERATING FIRST BITS IDENTIFYING A BANK OF MEMORY AND SECOND BITS ADDRESSING IDENTIFIED BANK

[75] Inventors: David A. Wallace, Chelmsford; Richard A. Lemay, Carlisle, both of Mass.

[73] Assignee: Bull HN Information Systems Inc., Billerica, Mass.

[21] Appl. No.: 19,897

[22] Filed: Feb. 27, 1987

[51] Int. Cl.⁴ ............... G06F 12/02; G06F 12/06
[52] U.S. Cl. .................. 364/200; 364/255.5; 364/246.2; 364/258.1; 364/255.3; 364/246.3; 364/259
[58] Field of Search ... 364/200 MS File, 900 MS File

[56] References Cited

U.S. PATENT DOCUMENTS

| | | | |
|---|---|---|---|
| 3,813,652 | 5/1974 | Elmer | 364/200 |
| 4,484,265 | 11/1984 | Czekalski | 364/200 |
| 4,587,637 | 5/1986 | Ishizuka | 365/230 |
| 4,698,749 | 10/1987 | Bhadriraju | 364/200 |

Primary Examiner—Raulfe B. Zache
Assistant Examiner—Emily Y. Chan
Attorney, Agent, or Firm—George Grayson; John S. Solakian; Gary D. Clapp

[57] ABSTRACT

A memory bank selection arrangement has a memory which is made up of smaller memories each of which has a number of banks of memory. First bits of a memory address are used by an address controller for addressing a location in a selected bank of a first of the smaller memories. The address may be incremented by the controller before being used to address a second of the smaller memories, and a carry output is generated when the first bits are incremented and there is a carry from the highest order bit thereof. The memory address also includes second bits which are input to an adder which increments the number represented by the second bits responsive to the carry out from the controller to compensate for the incrementation of said first bits. The incremented or unincremented number output from the adder is used by a selector to select a bank of the smaller memories so that they can be addressed using the incremented or unincremented first bits.

10 Claims, 4 Drawing Sheets

| ADDRESS | READ OUT — MEMORY BYTES | |
|---|---|---|
| | EVEN MEMORY 10 | ODD MEMORY 11 |
| 0 | 00,01 | 02,03 |
| 1 | 00,01 | 02,03 |
| 2 | 04,05 | 02,03 |
| 3 | 04,05 | 02,03 |
| 4 | 04,05 | 06,07 |
| 5 | 04,05 | 06,07 |
| 6 | 08,09 | 06,07 |
| 7 | 08,09 | 06,07 |
| 8 | 08,09 | 10,11 |
| 9 | 08,09 | 10,11 |
| ∘ | ∘ | ∘ |
| N-3 | n,n+1 | n+2,n+3 |
| N-2 | n,n+1 | n+2,n+3 |
| N-1 | n+4,n+5 | n+2,n+3 |
| N | n+4,n+5 | n+2,n+3 |
| N+1 | n+4,n+5 | n+6,n+7 |
| N+2 | n+4,n+5 | n+6,n+7 |
| N+3 | n+8,n+9 | n+6,n+7 |
| N+4 | n+8,n+9 | n+6,n+7 |

BANK SELECTOR 40

MEMORY BANK SELECTION ARRANGEMENT GENERATING FIRST BITS IDENTIFYING A BANK OF MEMORY AND SECOND BITS ADDRESSING IDENTIFIED BANK

FIELD OF THE INVENTION

This invention relates to a memory bank selection arrangement for accessing banks in a high capacity memory of a data processing system.

BACKGROUND OF THE INVENTION

In the data processing art the amount of memory that is provided on a single integrated circuit chip has steadily increased with technological improvements. This increase in memory size requires more and more leads on a package for addressing and control of the memory. However, the packaging requirements for these new high density dynamic memory chips has been to stay with a standard dual-in-line eighteen pin integrated circuit chip package. This has created a need in the art for new circuits and techniques for control and access of high density memory in standard integrated circuit packages.

One technique that has been created has been the use of row address strobe (RAS) and column address strobe (CAS) addressing signals that are sequentially applied to a high density memory over the same address leads. However, these techniques are limited to use with standard addressing techniques where all memory is addressed in parallel and do not work with special memory addressing arrangements. Accordingly, there is a need in the art for a memory bank selectron arrangement that can work with a special memory addressing arrangement where different parts of a large memory are addressed differently responsive to a single input address.

SUMMARY OF THE INVENTION

The needs of the prior art are satisfied by the present invention which provides a method and apparatus for bank selection in a high density memory addressed with a special addressing technique wherein different parts of a memory are addressed differently responsive to a single input address.

Basically, two high density memories are operated in parallel to provide thirty-two bit word operation, but the same input memory address is not always applied to both memories as is commonly done. A memory controller is responsive to one bit of an input memory address to increment the input address before it is applied to one of the two memories, and the incrementer also generates a carry signal. The bank selection apparatus is jointly responsive to the higher-order bits of the address output from the memory controller and to the carry signal output from the incrementer to modify the bank selection indicated by a part of the address to compensate for the incremented address sometimes indicating a memory location in a memory bank other than the bank which is actually to be addressed.

DESCRIPTION OF THE DRAWING

The invention will be better understood upon reading the following detailed description in conjunction with the drawing in which.

DETAILED DESCRIPTION OF THE PREFERRED EMBODIMENTS

Figures 1, 2:
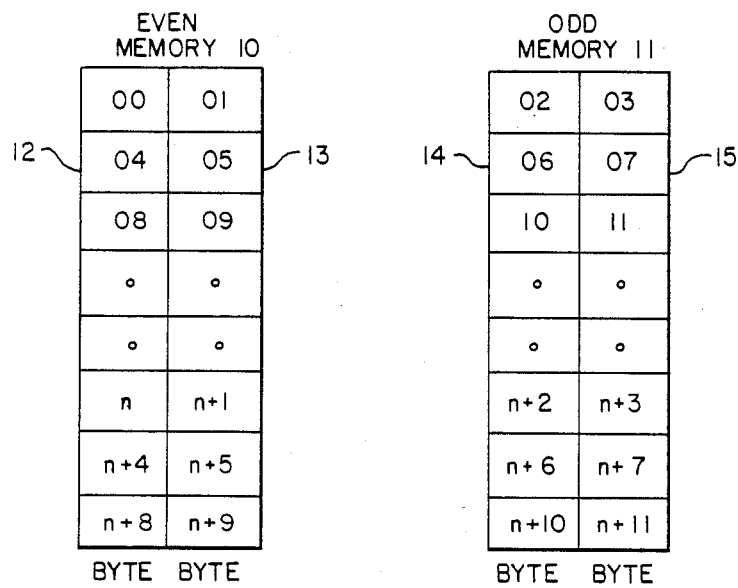
FIG. 1 is a table showing byte address locations for large word size memories of a type which may be utilized in practising the teachings of this invention
FIG. 2 is a table reflecting a special arrangement for addressing parallel connected high density memories so that the same address locations in each memory may or may not be addressed in response to an input address.

In the prior art large capacity memories made up from integrated circuit chip memory devices are typically organized in groups and sub-groups that are addressed in parallel. In FIG. 1 such a large capacity memory is represented as an even memory 10 and an odd memory 11, each of which in turn is made up of two smaller memories. In FIG. 1 even memory 10 is shown as two columns which represent a smaller memory 12 and a smaller memory 13; and odd memory is also shown as two columns which represent a smaller memory 14 and a smaller memory 15. Each column represents a number of eight-bit bytes that are addressed in the memories. A row in each of memories 10 and 11 is addressed by a single input address. That is, for example, an input address applied to the large memory made up of memories 10 and 11 would read out four bytes 00-03 or bytes 08-11. The result is that responsive to one input address two eight-bit bytes are read out of each of memories 10 and 11 to make up a thirty-two bit word.

The parallel read out described in the last paragraph is not the case when addressing memories 10 and 11 with the special addressing technique taught herein. An address used for concurrently addressing even memory 10 and odd memory 11 is applied unchanged to the addressing input of odd memory 11 to write or read that memory. However, the same address is not always applied unchanged to the addressing input of even memory 10. Instead, the input address is analyzed by an address controller 20 (shown in FIG. 3 and described further in this specification) before being applied to even memory 10. In some instances the input address is applied unchanged to the addressing input of even memory 10, and in other instances the generated address is incremented before being applied to the addressing input. Thus, even memory 10 and odd memory 11 may or may not be addressed by the same address and read out the same row of bytes responsive to an input address. For example, with reference to FIG. 2, which is a pictorial representation of a special way of reading out even memory 10 and odd memory 11 described in greater detail starting in the next paragraph, in some instances address controller 20 will cause bytes 04 and 05 to be read out of even memory 10 while bytes 02 and 03 are read out of odd memory 11. These two sets off bytes are not in the same address location in memories 10 and 11 as seen in FIG. 1. However, in another instance bytes 04 and 05 are read out of even memory 10 while bytes 06 and 07 are read out of odd memory 11. These latter two sets of bytes are in the same address location in memories 10 and 11.

In FIG. 2 is shown a table indicating pictorially which pair of eight-bit bytes in even memory 10 and in odd memory 11 are actually read out responsive to an input memory address used to read out of the two memories. For address "zero" eight-bit bytes 00 and 01 in even memory 10 are addressed, and eight-bit bytes 02-03 in odd memory 11 are addressed. These two sets of bytes are in the same actual memory location in memories 10 and 11 as may be seen in FIG. 1. The input "zero" address is applied unchanged to the addressing inputs of both memories 10 and 11 to access these bytes. Note in FIG. 2 that address "one" also accesses the same four eight-bit bytes 00-03.

In FIG. 2, input address "two" reads out bytes 04-05 from even memory 10 and bytes 02-03 from odd memory 11. Per FIG. 1 bytes 02-03 are at one address location in odd memory 11 and bytes 04-05 are at a different memory location in even memory 10. Thus, the addresses to be applied to even memory 10 and to odd memory 11 are different. The input address is applied unchanged to odd memory 11 to address bytes 02-03, but the address actually applied to even memory 10 is incremented by one to address bytes 04-05. This incrementation is done by address controller 20 shown in FIG. 3. Note in FIG. 2 that the different addresses applied to memories 10 and 11 are the same for input addresses "two" and "three" because the same four eight-bit bytes 02-05 are addressed.

Similarly, when memories 10 and 11 are addressed responsive to input addresses "four" and "five" the same address is applied unchanged to both even memory 10 and odd memory 11 and bytes 04 through 07 are addressed as seen in FIG. 2.

However, when input addresses "six" and "seven" are input to address controller 20, per FIG. 2 the same address locations in even memory 10 and odd memory 11 are not addressed. This is obvious because bytes 06-07 in odd memory 11 are in a different row from bytes 08-09 in even memory 10 in FIG. 1. Address controller 20 has incremented the input address and then applied it to the addressing inputs of even memory 10.

Thus, when reviewing FIGS. 1 and 2 and the last few paragraphs, it can be seen that for input addresses 0-1, 4-5, 8-9, N and N+1, etcetera, the input address is applied unchanged to both even memory 10 and odd memory 11. However, for addresses 2-3, 7-8, N-1, N+3, etcetera, the input memory address is applied unchanged to odd memory 11, but the address input to even memory 10 is the input address incremented by one.

To state it another way, and referring to FIG. 2, for input addresses "zero" and "one" the address is applied unchanged to both even memory 10 to access bytes 00-01 and to odd memory 11 to access bytes 02-03. However, for input addresses "two" and "three" the previous input address is applied to odd memory 11 to access bytes 02-03, but is incremented by one and used to address even memory 10 to access bytes 04-05.

Figure 3:
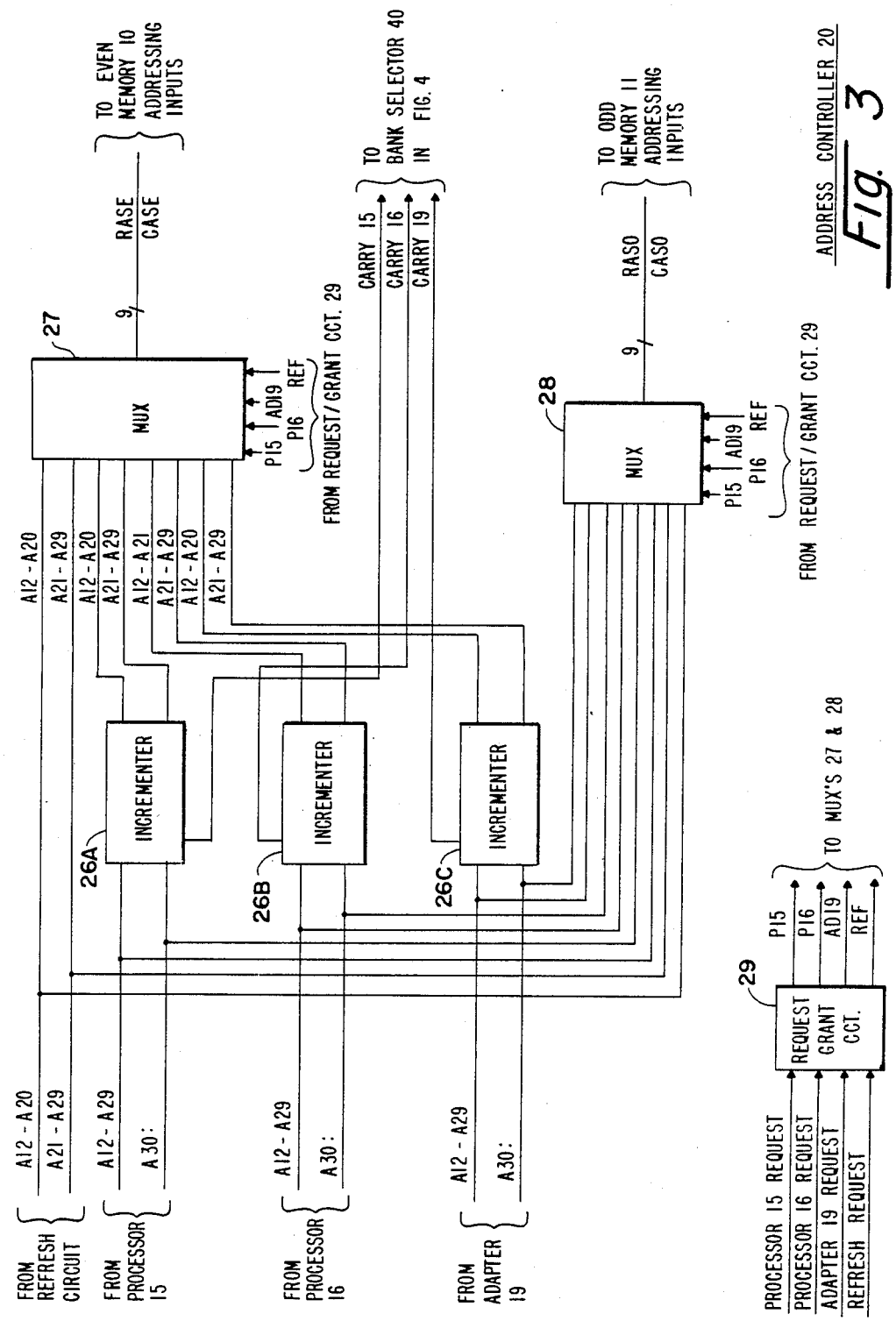
FIG. 3 is a block diagram of a memory controller that is responsive to a bit of an input address to increment the input address before it is used to address only part of parallel connected memories to implement the special addressing arrangement.

To implement the address incrementation described in the previous paragraphs the address controller 20 shown in FIG. 3 is used. There is one controller 20 and it has an address input from each circuit that can address the memory. Its inputs are address bits A12 through A30 and bit A30 is examined to determine if the address represented by the remaining bits A12 through A29 should be incremented before being applied to the addressing inputs of the even portion 10 of the memory. The same address bits A12 through A29, unincremented, are applied to the addressing inputs of an odd portion 11 of the memory. Each input address has thirty-two bits (0–31) with bit thirty-one being the lowest order bit. Accordingly, the thirtieth bit changes between zero and one for every other address. Because the address bits represent the byte address of a memory location, address bits 30 and 31 represent the double-byte (word and byte offset respectively) of the thirty-two bit memory data. Since the memory controller is designed to provide thirty-two bits whenever a memory read operation is performed, bit 30 is critical to determining whether the thirty-two bits provided are even-and-odd from the same memory data, or odd-and-even from two consecutive thirty-two bit memory data. When address bit thirty is a one, an incrementer 26 in address controller 20 responds to increment bits A12 through A29 of the addresses input to it from each circuit requesting access to the memory and applies the incremented address via its output to a multiplexer (MUX) 27. When bit thirty is a zero, incrementer 26 in address controller 20 does not increment the address bits at its inputs before applying ones of the addresses to multiplexer (MUX) 27 to be selectively applied to the addressing inputs of even memory 10. The same addresses are always applied unchanged to multiplexer (MUX) 28 to be selectively applied to the addressing inputs of odd memory 11.

Thus, for example, when an address input to one of the selectors 26 in address controller 20 is address "three" in FIG. 2, bit thirty in the address is a one. Address controller 20 responds to bit thirty being a one to increment the generated address by one and applies the incremented address via MUX 27 to the addressing inputs of even memory 10 while the unincremented address is applied to the addressing inputs of odd memory 11. For input address "five" in FIG. 3, bit thirty of the address is a zero and incrementer 26 in address controller 20 does not increment the address. After being selected by MUXs 27 and 28 the address is applied unchanged to the addressing inputs of both even memory 10 and odd memory 11. If incrementation of an address results in a carry, there is a carry output from the appropriate one of selectors 26 to be used by ones of the bank selectors 40 as described further in this specification.

Address controller 20 services memory access requests from processors 15 and 16, adapter 19 and a memory refresh circuit (not shown) that can address the memory made up of memories segments 10 and 11 so that addresses from these requesting circuits may be pre-incremented, if required, before ones of the addresses are applied to the memory. Pre-incrementation of addresses minimizes the time required to address the memory after a requesting circuit is granted access The address leads A12 through A30 from processor 15 are input to both incrementer 26A and multiplexer (MUX) 28. The address leads A12 through A30 from processor 16 are input to both incrementer 26B and MUX 28. The address leads A12 through A30 from adapter 19 are input to both incrementer 26C and MUX 28. Address leads A12 through A29 from the memory refresh circuit are input to both MUXs 27 and 28. There is no lead A30 from the refresh circuit since the refresh address will never be incremented. Since memory refresh circuits and their operation are well known in the art one is not disclosed herein to avoid detracting from the description of the invention.

Incrementer logic 26 comprises a programmable arithmetic logic (PAL) circuit designated 22V10 and available from Advanced Micro Devices and other suppliers of integrated circuits. To program the PAL to respond to address bit thirty being a one to increment the address, an Abel PAL Compiler manufactured by Data I/O of Redmond, Wash. is used. This PAL is programmed with the mathematical expression address-out=address—$_{in}$ &! ad—30 #(address—$_{in+1}$) & ad—30;. In operation, bits A12-A30 of each address are input to the programmed PAL of incrementer logic 26 and it responds to bit thirty being a one to increment the address bits on leads A12-A29.

Multiplexers 27 and 28 are respectively used to apply ones of the addresses input to address controller 20 to even memory 10 and odd memory 11 respectively. Multiplexers 27 and 28 are each implemented with a 4:1 multiplexer integrated circuit designated 74AS257 available from Texas Instruments and other device manufacturers. Memories 10 and 11 are large capacity dynamic random access memories (DRAM) that are addressed using row address strobe (RAS) and column address strobe (CAS) signals in a manner well known in the art. This two part address scheme of RAS and CAS signals, each nine bits in length, are sequentially output from multiplexers 27 and 28 responsive to a timing signal input thereto. The timing signal first causes bits A21-A29 to be selected and output from multiplexers 27 and 29 as the RAS signal, and then causes bits A12-A20 to be selected and output from the multiplexers as the CAS signal. As shown in FIG. 3 multiplexer 27 provides RASO and CASO addressing signals to odd memory 11, and multiplexer 28 provides RASE and CASE addressing signals to even memory 10. Responsive to the RAS and CAS signals memories 10 and 11 are addressed in a manner well known in the art so is not described herein for the sake of brevity.

Since there are four circuits vying for addressing access to memories 10 and 11, multiplexers 27 and 28 are utilized to connect the address from only one of the vying circuits (processors 15 and 16, adapter 19 and memory refresh) to memories 10 and 11 at a time. To connect only one address at a time to the memory multiplexers 27 and 28 are controlled by a request grant circuit 29 which is also shown in FIG. 3. Request grant circuits are well known in the art and one is taught in U.S. Pat. No. 4,493,036, having the same assignee as the present invention. There are four request inputs to request grant circuit 29. They are a request from processor 15, a request from processor 16, a request from adapter circuit 19, and a request from the memory refresh circuit (not shown). Memories 10 and 11 are NMOS memory, well known in the art, and in operation charge slowly leaks off and must be refreshed or the contents of memory are lost. Since it cannot be permitted to lose the contents of memory, its contents are periodically refreshed and a refresh request must have the highest priority.

In operation of request grant circuit 29, when address controller 20 is idle the first of the four requests to appear at the inputs of circuit 29 is immediately granted. However, if two requests from a first and a second circuit appear simultaneously, the request from the circuit having the higher priority is first granted access through multiplexers 27 and 28 to memories 10 and 11. When the first circuit to which access to the memory has been granted is finished with a read or write operation, the access request from the second circuit is granted. If while the first circuit has addressing access via multiplexers 27 and 28 to memories 10 and 11 a third circuit requests access to the memories, request grant circuit 29 will then select between the second and third circuits requesting access and the one of these two circuits having the higher priority will be granted access via multiplexer 27 and 28 to memories 10 and 11 following the first circuit.

There is also an End of Cycle input to circuit 29 which has a signal thereon from a system clock or timing circuit, not shown but well known in the art, which indicates the start of another machine cycle. This timing signal restarts circuit 29 to make another decision and grant access to address controller 20.

Whichever access requesting circuit is granted access to the memory by request grant circuit 29, it will have its associated request granted output lead (P15, P16, AD19 or REF) go high. For example, if processor 15 requests connection to memories 10 and 11 and the request is granted by circuit 29, output lead P15 goes high. Output lead P15 is a control input to both MUXs 27 and 28 and causes them to connect the incremented-/unincremented addresses from processor 15 to the addressing inputs of memories 10 and 11. Although not shown in FIG. 3, the request grant outputs from request grant circuit 29 are also connected to their respective access requesting circuits so that the requesting circuits receive an indication when their request is granted and they are connected to memories 10 and 11.

Figure 4:
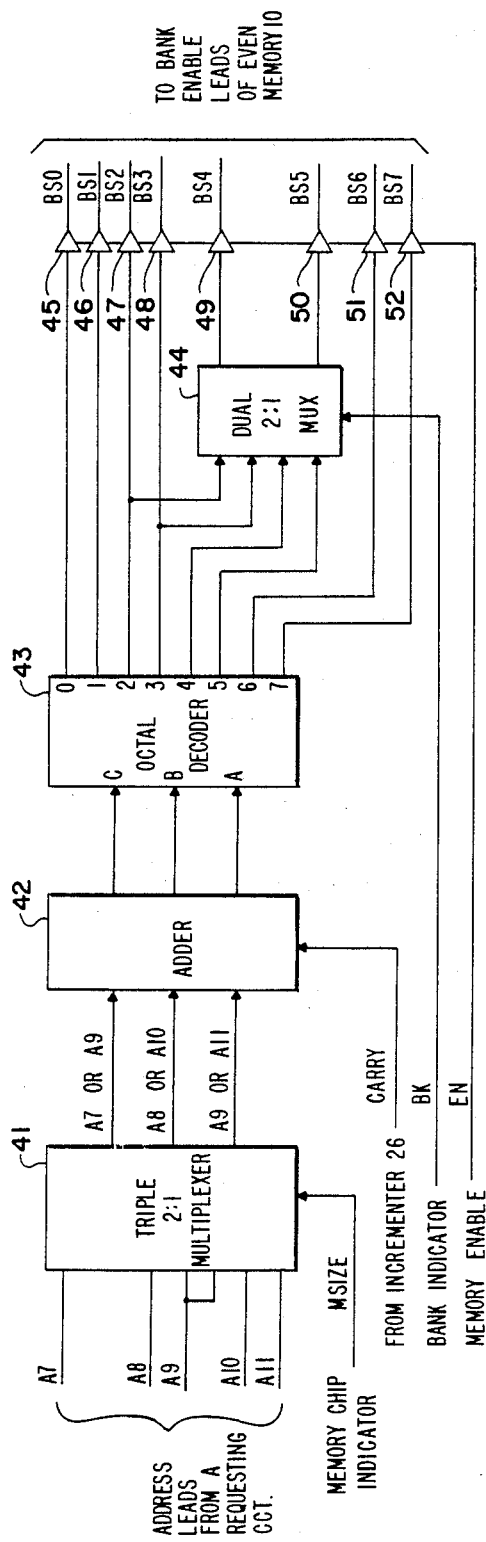
FIG. 4 is a block diagram schematic of bank selection apparatus used to select even banks of large memory addressed to implement the special addressing arrangement.
Figure 5:
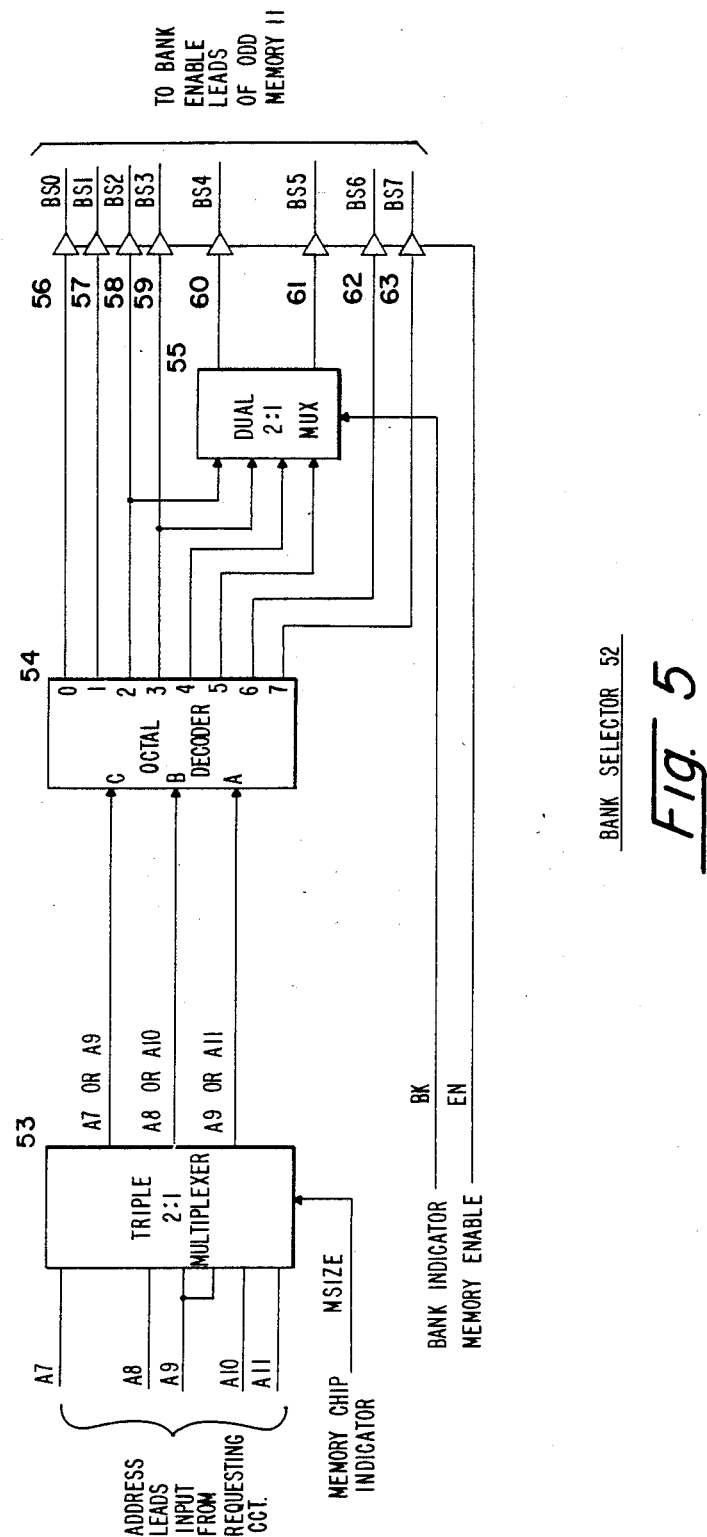
FIG. 5 is a block diagram schematic of bank selection apparatus used to select odd banks of large memory addressed to implement the special addressing arrangement.

In FIG. 4 is shown a detailed block diagram schematic of an even bank selector 40 in accordance with the teaching of the present invention. In FIG. 5 is shown a detailed block diagram schematic of an odd bank selector 52. There is an even bank selector 40 and an odd bank selector 52 for each circuit that can request access and be connected to and address the memory. Since the bank selectors are all identical only one of each of them is described herein.

In FIG. 4 address leads A7 through a11 are input to even bank selector 40 from only one of the requesting circuits. There are eight output leads BS0 through BS7 from bank selector 40 that are respectively connected via a tri-state bus (not shown) to the eight bank select leads of even memory bank 10. Only one of leads BS0 through BS7 are selected and energized at any one time since only one even memory bank can be selected at a time. In addition, the tri-state bus drivers are enabled by a signal indicating that the requesting circuit has been granted access to the memory. When the signal on a selected one of output leads BS0 through BS7 is energized the even memory bank 10 to which it is connected is enabled and subsequent RAS and CAS addressing signals from address controller 20 are applied to the addressing inputs of the selected even and odd memory bank. During refresh, all bank select signals are asserted simultaneously by means of a 74S240 tri-state driver (not shown) available from Texas Instruments and other device manufacturers.

The A7 through A11 addressing leads from an associated requesting circuit are input to multiplexer 41 in an even bank selector 40. Multiplexer 41 is a triple 2:1 multiplexer. The function of multiplexer 41 is to select either address leads A7 through A9 or leads A9 through A11 to be connected to adder 42. The control of multiplexer 41 is by a signal on leads MSIZE which indicates the capacity of the memory chips in the memory. If the memory chips each have a capacity of one megabyte, leads MSIZE are enabled to select address leads A7 through A9; and if the memory chips each have a capacity of two-hundred fifty-six kilobytes, leads MSIZE are enabled to select address leads A9 through A11. The selected address leads are output from multiplexer 41 and are input to an adder circuit 42. Adder 42 adds one to the three bit binary number input to it depending on the presence of a carry signal on control lead CARRY from an incrementer 26 in bank selector 40 in FIG. 3. When the even memory address in address controller 20 is incremented and generates a carry in the process, the carry is a high signal on lead CARRY which causes adder 42 to add one to the three bit binary number at its input. When there is no carry signal lead CARRY is low and adder 42 responds to not increment the three bit number at its input.

The incremented or unincremented binary number output from adder 42 is input to octal decoder 43. These three binary bits select one of eight outputs from decoder 43 in a manner known in the art.

The outputs from octal decoder 43 are input to a bank of eight tri-state driver amplifiers 45 through 51. The tri-state selection leads of amplifiers 45 through 51 are tied together as shown and are connected to lead EN. A memory enable signal is applied to lead EN which enables all eight amplifiers to connect their input to their output. Since there is a bank select signal on only one of the eight leads output from octal decoder 43, only one of output leads BS0 through BS7 has a signal thereon and only one memory bank is selected to be addressed with the RAS and CAS address signals output from address controller 20 in FIG. 3.

There is also a multiplexer (MUX) 44 connected between octal decoder 43 and the tri-state drivers 45 through 51. MUX 44 is a dual 2:1 multiplexer. The leads going to the inputs of drivers 47 and 48 are respectively connected to one of the two inputs of each of the two multiplexers within MUX 44. The other input to each of the two multiplexers is as shown. The control of the two multiplexers in MUX 44 is by way of lead BK which has a signal thereon indicating if there are two or four memory banks on each physical circuit board. The two outputs from the two multiplexers in MUX 44 are connected to drivers 49 and 50 as shown. This permits banks 0 and 1 to reside on one half-populated circuit board and banks 2 and 3 to reside on the other.

Bank selector 40 may also be implemented with a programmable array logic circuit such as the 22V10 available from Advanced Micro Devices and other sources by programming it to respond to the same A7 through A11 address bits, carry out signal from address controller 20 memory size, and bank indicator described hereinabove to provide the same bank select output signal onto one of a plurality of output leads equal in number to the number of memory banks and being respectively connected thereto.

Bank selector 52 shown in FIG. 5 is basically identical to bank selector 40 in FIG. 4. Instead, the difference is that leads A7 through A9, or leads A9 through A11 are multiplexed through multiplexer 53 and input directly to octal decoder 54. The remainder of the operation of bank selector 52 is the same as that described for bank selector 40 except the outputs go to the bank enable leads of odd memory 11 instead of to even memory 10. When a particular requesting circuit (processors 15 or 16, adapter 19 or the refresh circuit) is granted access to memories 10 and 11, the outputs BS0–BS7 from both the associated bank selectors 40 and 52 are appropriately enabled to select a bank in even memory 10 and in odd memory 11. Thereafter, the RAS and CAS addressing signals output from address controller 20 address a byte in each of the two memories.

While what has been described above is the preferred embodiment of the invention, it will apparent to those skilled in the art that numerous changes may be made without departing from the spirit and scope of the invention.

What is claimed is:

1. A memory bank selection arrangement for use in a data processing system including a memory wherein an address used for addressing said memory to read or write locations therein includes first bits for identifying a bank of said memory to be selected and addressed by second bits of said address, said arrangement comprising:
    an address controller for processing said second bits of said address before they are used to address a location in said memory, said address controller being responsive to a predetermined bit of the second address bits to increment said second bits, said address controller generating a carry output when the incrementing of said second bits results in there being a carry from the highest order bit of said second bits, and
    a bank selector to which said first bits are input, said bank selector being responsive to said carry output generated by said address controller to increment the binary number represented by said first bits and said first bits, being used to select a bank in said memory to be addressed using said second bits.

2. The invention in accordance with claim 1 wherein said bank selector comprises:
    an adder to which said first bits are input, and said adder is responsive to said carry output from said address controller to increment the number represented by said first bits and provide another number used to indicate said selected bank of memory, and
    a decoder having a plurality of output leads with one lead being connected to each bank of said memory, said decoder being responsive to the first bits, the output from said adder energizing one of said output leads and thereby enable the bank of said memory t which the energized lead is connected, said selected bank of memory then being addressed by said second bits, output from said address controller.

3. The invention in accordance with claim 1 wherein said bank selector comprises a programmable logic array circuit programmed to respond to said first bits and to said carry output from said address controller to increment the binary number represented by said first bits and generate a signal onto one of a plurality of output leads with one lead being connected to each bank of said memory, said signal enabling one bank of said memory to be addressed to read or write locations therein.

4. The invention in accordance with claim 3 wherein a number of circuits vie to use said memory and further comprising a multiplexing arrangement for connecting an address from only one of said circuits at a time to said programmable array logic circuit.

5. A memory bank selection arrangement for use in a data processing system including a memory which has a number of banks, wherein first bits of a memory address are used for addressing a location in a selected bank to read or write therein and are incrementable by an address controller before being used to address a bank of said memory, wherein said address controller generates a carry output when the incrementing of said first bits result in there being a carry from the highest order bit of said first bits, and said address includes second bits for identifying a bank in said memory to be selected and then addressed by the first bits, of said address, said arrangement comprising:

a bank selector to which said second bits indicating said selected bank of memory are input, said bank selector being responsive to said carry output generated by said address controller to increment the binary number represented by said second bits, and the second bits, then being used to select a bank in said memory to be addressed using said first bits.

6. The invention in accordance with claim 5 wherein said bank selector comprises:

an adder to which said second bits are input and responsive to said carry output from said address controller to increment the number represented by said second bits and provide another number used to indicate said selected bank of said memory, and a decoder having a plurality of output leads with one output lead being connected to each bank of said memory, said decoder being responsive to the first bits, from said adder to energize one of said output leads and thereby enable the bank of said memory to which the energized lead is connected said selected bank of memory then being addressed by said second bits, output from said address controller.

7. The invention in accordance with claim 5 wherein said bank selector comprises a programmable logic array circuit programmed to respond to said first bits and to said carry output from the address controller to increment the binary number represented by said first bits and generate a signal onto one of a plurality of output leads with one lead being connected to each bank of said memory, said signal enabling one bank of said memory to be addressed to read or write locations therein.

8. The invention in accordance with claim 7 wherein a number of circuits vie to use said memory and further comprising a multiplexing arrangement for connecting the address from only one of said circuits at a time to said programmable array logic circuit.

9. A method used in a data processing system for selecting a bank in a memory which has a number of banks, wherein first bits of an address used for addressing a location in a selected bank of said memory are incrementable before being used to address the memory, wherein a carry output is generated when the incrementing of said first bits results in there being a carry from the highest order bit of said first bits, and said address includes second bits for identifying a bank in said memory to be selected and then addressed by the first bits, whether incremented or not, of said address, said method comprising the steps of:

incrementing said second bits when a carry output signal is generated to compensate for the incrementation of said first bits, and using said second bits, to select a bank in said memory.

10. A method used in a data processing system for selecting a bank in a memory which has a number of banks, wherein first bits of an address are used for addressing a location in a bank and are modifiable before being used to address said memory, said second bits of said address identify a bank in said memory to be selected and then addressed using the first bits of said address, and a third bit of said address in a control bit, said method comprising the steps of:

incrementing said first bits responsive to the state of said third bit in said address before said first bits are used to address said memory, generating a carry output signal when the incrementing of said first bits results in there being a carry from the highest order bit of said first bits; and incrementing said second bits when a carry output signal is generated to compensate for the incrementation of said first bits, said second bits, then being used to select a bank in said memory which is then addressed using said first bits.

* * * * *